(12) United States Patent
Schenk et al.

(10) Patent No.: US 8,275,054 B2
(45) Date of Patent: Sep. 25, 2012

(54) METHODS AND APPARATUSES FOR DATA TRANSMISSION

(75) Inventors: Heinrich Schenk, München (DE); Axel Clausen, München (DE)

(73) Assignee: Lantiq Deutschland GmbH, Neubiberg (DE)

( * ) Notice: Subject to any disclaimer, the term of this patent is extended or adjusted under 35 U.S.C. 154(b) by 1043 days.

(21) Appl. No.: 12/195,602

(22) Filed: Aug. 21, 2008

(65) Prior Publication Data

US 2010/0046593 A1 Feb. 25, 2010

(51) Int. Cl.
*H04K 1/10* (2006.01)
(52) U.S. Cl. ....................................................... 375/260
(58) Field of Classification Search .................. 375/219, 375/220, 222, 257, 259–261, 356, 346; 370/278, 370/282, 286, 289–292; 379/406.01, 406.05, 379/406.08, 406.09, 406.1, 406.12–406.14, 379/399.01, 414, 417; 455/14–17, 24, 69, 455/88
See application file for complete search history.

(56) References Cited

U.S. PATENT DOCUMENTS

| | | | |
|---|---|---|---|
| 6,987,800 B2 | 1/2006 | Nordstrom et al. | |
| 7,023,908 B2 | 4/2006 | Nordstrom et al. | |
| 7,817,745 B2 * | 10/2010 | Cioffi et al. | 375/296 |
| 2003/0086362 A1 * | 5/2003 | Hasegawa et al. | 370/201 |
| 2004/0157566 A1 | 8/2004 | Fishman | |
| 2006/0274893 A1 | 12/2006 | Cioffi et al. | |
| 2007/0047631 A1 | 3/2007 | Bostoen et al. | |
| 2007/0133723 A1 | 6/2007 | Cheong et al. | |
| 2008/0089433 A1 * | 4/2008 | Cho et al. | 375/267 |
| 2008/0198909 A1 * | 8/2008 | Tsatsanis et al. | 375/219 |
| 2009/0116582 A1 | 5/2009 | Ashikhmin et al. | |
| 2009/0296865 A1 * | 12/2009 | Ashikhmin et al. | 375/358 |
| 2010/0111237 A1 * | 5/2010 | Fanson | 375/346 |

FOREIGN PATENT DOCUMENTS

WO 2009058306 A1 5/2009

OTHER PUBLICATIONS

Cendrillon, R. et al. "The Linear Zero-Forcing Crosstalk Canceler is Near-Optimal in DSL Channels." IEEE Global Telecommunications Conference, 2004 (GLOBECOM '04). vol. 4, Nov. 29-Dec. 3, 2004, pp. 2334-2338.
Duvaut, P. et al. "Adaptive Off-Diagonal MIMO Pre-coder (ODMP) for Downstream DSL Self FEXT Cancellation." IEEE Global Telecommunications Conference, 2007 (GLOBECOM '07). Nov. 26-30, 2007, pp. 2910-2915.
Leshem, A. et al. "A Low Complexity Coordinated FEXT Cancellation for VDSL." Proceedings of the 2004 11th IEEE International Conference on Electronics, Circuits and Systems, 2004 (ICESC 2004). Dec. 13-15, 2004, pp. 338-341.
ITU-T (International Telecommunication Union) G.944.1 (Feb. 2007). "Series G: Transmission Systems and Media, Digital Systems and Networks, Digital Sections and Digital Line System—Access Networks, Handshake Procedures for Digital Subscriber Line (DSL) Transceivers."

(Continued)

*Primary Examiner* — Young T. Tse
(74) *Attorney, Agent, or Firm* — Murphy, Bilak & Homiller, PLLC

(57) ABSTRACT

In an embodiment, a communication device is provided comprising transmit circuitry and crosstalk reduction circuitry. In an embodiment, the crosstalk reduction circuitry is configured to receive crosstalk information indicative of crosstalk between a plurality of communication connections for only a part of communication channels of said communication connections.

9 Claims, 11 Drawing Sheets

OTHER PUBLICATIONS

ITU-T (International Telecommunication Union) G.993.2 (Feb. 2006). "Series G: Transmission Systems and Media, Digital Systems and Networks, Digital Sections and Digital Line System—Access Networks, Very High Speed Digital Subscriber Line Transceivers 2 (VDSL2)."

ITU-Telecommunication Standardization Sector. Temporary Document GB-058R1. "G.PLOAM, G.ADSL, G.VDSL—Overview of Technologies for Vectored DSL." Jun. 12-16, 2006.

ITU-Telecommunication Standardizatin Sector. Temporary Document NC-028. "G.vdsl: Answers to Questions and Concerns Related to Reporting the Error (f) for Self FEXT Cancellation." Apr. 16-20, 2007.

ITU-Telecommunication Standardization Sector. Temporary Document 08CS-067. "G.vector: Fast Seamless Joining via CPE Correlation of Joining Signature Sequence." Apr. 7-11, 2008.

ITU-Telecommunication Standardization Sector. COM 15-C 177-E. "G.vds12: Pilot Sequence Assisted Vector Channel Estimation." Oct. 2006.

ITU-T SG15. Temporary Document 267-WP1. "G.vector: Draft text for Recommendation G.vector." Feb. 11-22, 2008.

NIPP-NAI-2007-023. ATIS Network Interface, Power & Protection Committee (NIPP), Subcommittee Network Access Interfaces (NAI). "Implementation of the 'Abuse of Receivers' Method of FEXT Cancellation." Feb. 12-15, 2007.

NIPP-NAI-20074-013R4. "Second Letter Ballot Draft of the DSM Technical Report." Feb. 12-15, 2007.

Office Action issued Nov. 23, 2010 in re German Application 10 2009 038 272.0-31.

Author Unknown. "Dynamic Spectrum Management for Digital Subscriber Lines—Edition 2." Alcatel Technology White Paper. Available at: http://whitepapers.zdnet.com/abstract.aspx?docid=151919, Jun. 2005.

* cited by examiner

METHODS AND APPARATUSES FOR DATA TRANSMISSION

BACKGROUND

So-called vectoring or vectored data transmission is a technique for coordinated transmission or reception of data from a plurality of transmitters to a plurality of receivers via a plurality of communication connections in order to improve the transmission, for example to reduce the influence of crosstalk. Either transmitters or receivers are co-located.

For example, in DSL (digital subscriber line) transmission systems, for example VDSL (very high bit rate DSL) transmission systems, data may be transmitted from a central office (CO) or other provider equipment to a plurality of receivers located in different locations, for example in customer premises (CPE), via a plurality of communication lines. Crosstalk resulting from signals on different lines transmitted in the same direction, also referred to as far end crosstalk (FEXT), may result in a reduced data throughput. Through vectoring, signals transmitted over the plurality of communication lines from the central office or received via the plurality of communication lines in the central office may be processed jointly in order to reduce such crosstalk, which joint processing corresponds to the above-mentioned vectoring. In this respect, the reduction of crosstalk by coordinated transmission of signals is sometimes referred to as crosstalk precompensation, whereas the reduction of crosstalk through joint processing of the received signals is sometimes referred to as crosstalk cancellation. The communication connections which are processed jointly are sometimes referred to as vectored group.

For this kind of crosstalk reduction, for example in an initialization phase of the data transmission system or during operation of the data transmission system, parameter describing the crosstalk between the communication connections are obtained and the crosstalk reduction is performed based on these parameters. The number of such parameters increases with increasing number of communication lines or other communication connections which are to be processed. This may necessitate the transmission and processing of comparatively large amounts of data.

SUMMARY

According to an embodiment, a method is provided comprising:
transmitting training signals via a plurality of communication channels of a plurality of communication connections,
receiving crosstalk information indicative of crosstalk between said plurality of communication connections for only a part of said communication channels.

The above summary is merely intended to give a brief overview of some features of some embodiments of the present invention, and other embodiments may comprise additional and/or different features than the ones mentioned above. Furthermore, while above an embodiment of a method is mentioned, other embodiments may relate to systems or devices. Therefore, this summary is not to be construed as limiting the scope of the present application.

DETAILED DESCRIPTION OF THE INVENTION

Figure 1:
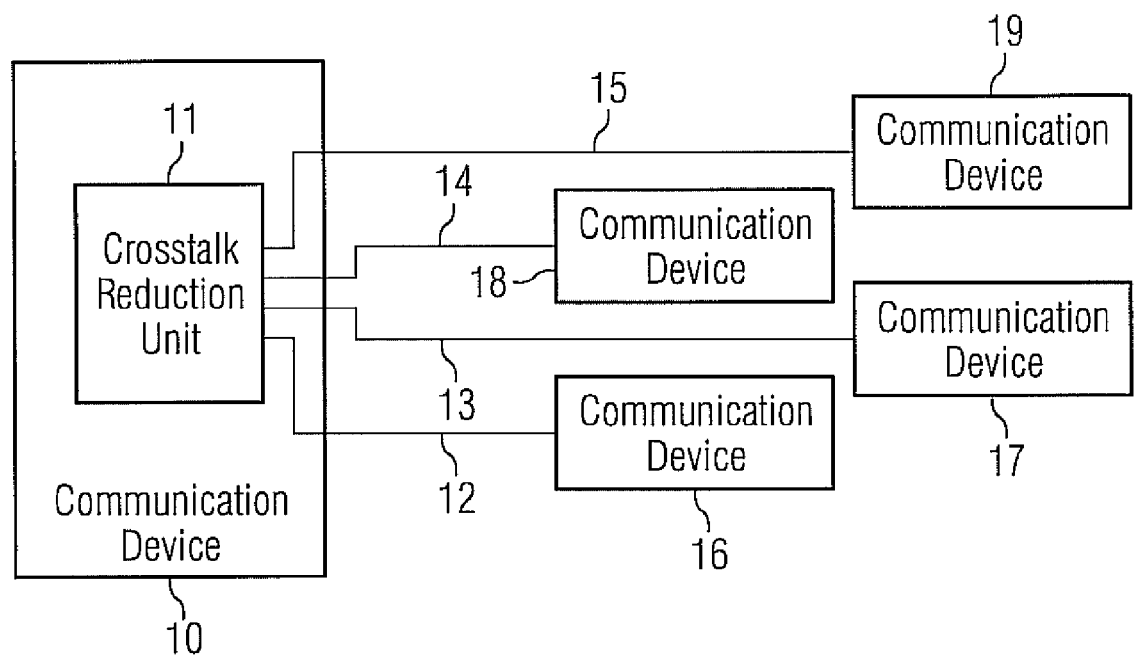
FIG. 1 shows a block diagram illustrating the basic structure of a communication system according to an embodiment of the present invention.

In the following, some embodiments of the present invention will be described in detail. It is to be understood that the following description is given only for the purpose of illustration and is not to be taken in a limiting sense. The scope of the invention is not intended to be limited by the embodiments described hereinafter with reference to the accompanying drawings, but is to be intended only to be limited by the appended claims and equivalents thereof.

It is also to be understood that in the following description of embodiments any direct connection or coupling between functional blocks, devices, components, circuit elements or other physical or functional units shown in the drawings or described herein, i.e. any connection without intervening elements could also be implemented by an indirect connection or coupling, i.e. a connection or coupling with one or more intervening elements. Furthermore, it should appreciated that functional blocks or units shown in the drawings may be implemented as separate circuits in embodiments, but may also be fully or partially implemented in a common circuit in other embodiments. It is further to be understood that any connection which is described as being wire-based in the following specification may also be implemented as a wireless communication unless noted to the contrary.

It should be noted that the drawings are provided to give an illustration of some aspects of embodiments of the present invention and therefore are to be regarded as schematic only. In particular, the elements shown in the drawings are not necessary to scale with each other, and the placement of various elements in the drawings is chosen to provide a clear understanding of the respective embodiment and is not to be construed as necessarily being a representation of the actual relative locations of the various components in implementations according to an embodiment of the invention.

The features of the various embodiments described herein may be combined with each other unless specifically noted otherwise.

The term "communication connection" as used herein is intended to refer to any kind of communication connection including wire-based communication connections and wireless communication connections.

The term "communication channel" as used herein is intended to refer to a communication channel on a communication connection, wherein on a single communication connection a plurality of communication channels may be present. For example, in DSL communication on a single wireline data is transmitted on a plurality of carriers having different frequencies, these carriers also being referred to as "tones". Such carriers or tones are examples for communication channels for the case of DSL data transmission. Another example for a communication channel is a logic channel which may be used for transmitting specific kinds of data, for example control information, wherein such a logic channel may use one or more of the above-mentioned carriers or tones in DSL communication.

Turning now to the Figures, in a communication system shown in FIG. 1, a communication device 10 communicates with communication devices 16, 17, 18 and 19 via respective communication connections 12, 13, 14 and 15. While in FIG. 1 four communication devices 16, 17, 18 and 19 are shown, in other embodiments any suitable other number of communication devices may also be provided.

In an embodiment, the communication via communication connections 12, 13, 14 and 15 is a bidirectional communication. In such an embodiment, communication device 10 may comprise a transceiver for each of the communication connections 12, 13, 14 and 15, and each communication device 16, 17, 18 and 19 also may comprise a transceiver. In another embodiment, all or some of communication connections 12, 13, 14 and 15 may be unidirectional communication connections. In another embodiment, all or some of the communication devices 16, 17, 18, 19 might be co-located.

In the embodiment of FIG. 1, couplings between the communication connections 12-15 may cause crosstalk, for example if some or all of the communication connections are wire lines running close to each other. Through at least partial joint processing of the signals transmitted from communication device 10 to communication devices 16, 17, 18 and 19 and through at least partial joint processing of signals received from communication devices 16, 17, 18 and 19 at communication device 10 in a crosstalk reduction unit 11, the influence of such crosstalk may be reduced. As already mentioned, the joint processing for crosstalk reduction is also referred to as vectoring, and the communication connections which are subjected to such a crosstalk reduction are also referred to as vectored group.

In the following, the transmission direction from communication device 10 to communication devices 16, 17, 18 and 19 will be referred to as downstream direction, and the opposite transmission direction from communication devices 16, 17, 18 and 19 to communication device 10 will be referred to as upstream direction. Reduction of crosstalk in the downstream direction is also referred to as crosstalk precompensation since the signals transmitted are modified before transmission, i.e. before the actual crosstalk occurs, whereas the reduction of crosstalk in the upstream direction is also referred to as crosstalk cancellation as here through joint processing in crosstalk reduction unit 11 the crosstalk is reduced or cancelled after it has occurred.

In embodiments, crosstalk cancellation may for example be performed by calculating received signals for each communication connection depending on a linear combination of all received signals on all communication connections of the vectored group, and crosstalk precompensation may be performed by calculating signals to be transmitted via each communication connection depending on a linear combination of signals to be transmitted on all communication connections. However, other calculation methods, for example non-linear calculations, are also possible.

In order to perform this crosstalk reduction, i.e. the vectoring, the crosstalk reduction unit 11 has to be "trained", i.e. the crosstalk reduction unit 11 needs information regarding the actual crosstalk occurring between the communication connections in the vectored group. This may for example be achieved by transmitting predetermined training signals, for example pilot signals, via the communication connections and analyzing the received signals to determine the crosstalk. In embodiments, data transmission via the communication connections comprises the transmission of pilot signals or symbols, wherein between the pilot signals other data like payload data may be transmitted. In an embodiment, the pilot signals or modified pilot signals are used for training crosstalk reduction unit 11. In an embodiment, synchronization signals or synchronization symbols may be used as pilot signals. However, other training signals may also be used.

In an embodiment, some or all of the communication connections 12-15 of FIG. 1 comprise a plurality of communication channels. In an embodiment, for training in the downstream direction, communication device 10 transmits the above-mentioned training signals on all communication channels of communication lines 12-15 to communication devices 16-19. Communication devices 16-19 then return error signals indicative of a deviation between the received training signals and the sent training signals back to communication device 10. Based on these error signals, crosstalk reduction unit 11 calculates first crosstalk reduction parameters for the downstream direction, which may also be referred to as first crosstalk precompensation parameters or crosstalk precompensation coefficients, for a first subset of the communication channels based on the error signals. The error signals constitute crosstalk information indicative of the crosstalk occurring between the communication channels of the communication connections 12-15. Then, in an embodiment, crosstalk reduction unit 11 calculates second crosstalk precompensation parameters for a second subset of the communication channels which may comprise all communication channels not comprised in the first subset based on the first crosstalk precompensation parameters. It should be noted that in an embodiment communication devices 16-19 may send back error information only for the communication channels of the first subset. However, in another embodiment error information for all communication channels or for communication channels of the first subset and some additional communication channels may be transmitted to communication device 10.

In another embodiment, for the upstream direction crosstalk reduction parameters, which in this case may also be referred to as crosstalk cancellation parameters, may be determined in a similar manner. In this case, in an embodiment communication devices 16 to 19 transmit training signals to communication device 10, error signals are determined in communication device 10, first crosstalk cancellation parameters for a first subset of communication channels used in the upstream direction are determined based on the error signals, and crosstalk cancellation parameters for a second subset of the communication channels which may comprise those communication channels not comprised by the first subset are determined based on the first crosstalk cancellation parameters.

It should be noted that in many cases the communication channels and the downstream direction will be different from the communication channels in the upstream direction. For example, in DSL communication the communication channels in the downstream direction may use (a) different frequency range(s) than the communication channels in the upstream direction. Therefore, in such cases the first and second subsets in the downstream direction also differ from the first and second subset in the upstream direction.

It should be noted that in an embodiment the crosstalk reduction parameters are determined before determining the crosstalk cancellation parameters. In another embodiment, this order is reversed, and the crosstalk cancellation parameters are determined before determining the crosstalk reduction parameters. In still another embodiment, the crosstalk cancellation parameters and the crosstalk precompensation parameters may be determined simultaneously.

Next, with reference to FIGS. 2 to 5, embodiments of DSL (digital subscriber line) communication systems and methods implemented therein will be described. Such communication systems may for example be VDSL2 communication systems.

Figure 2:
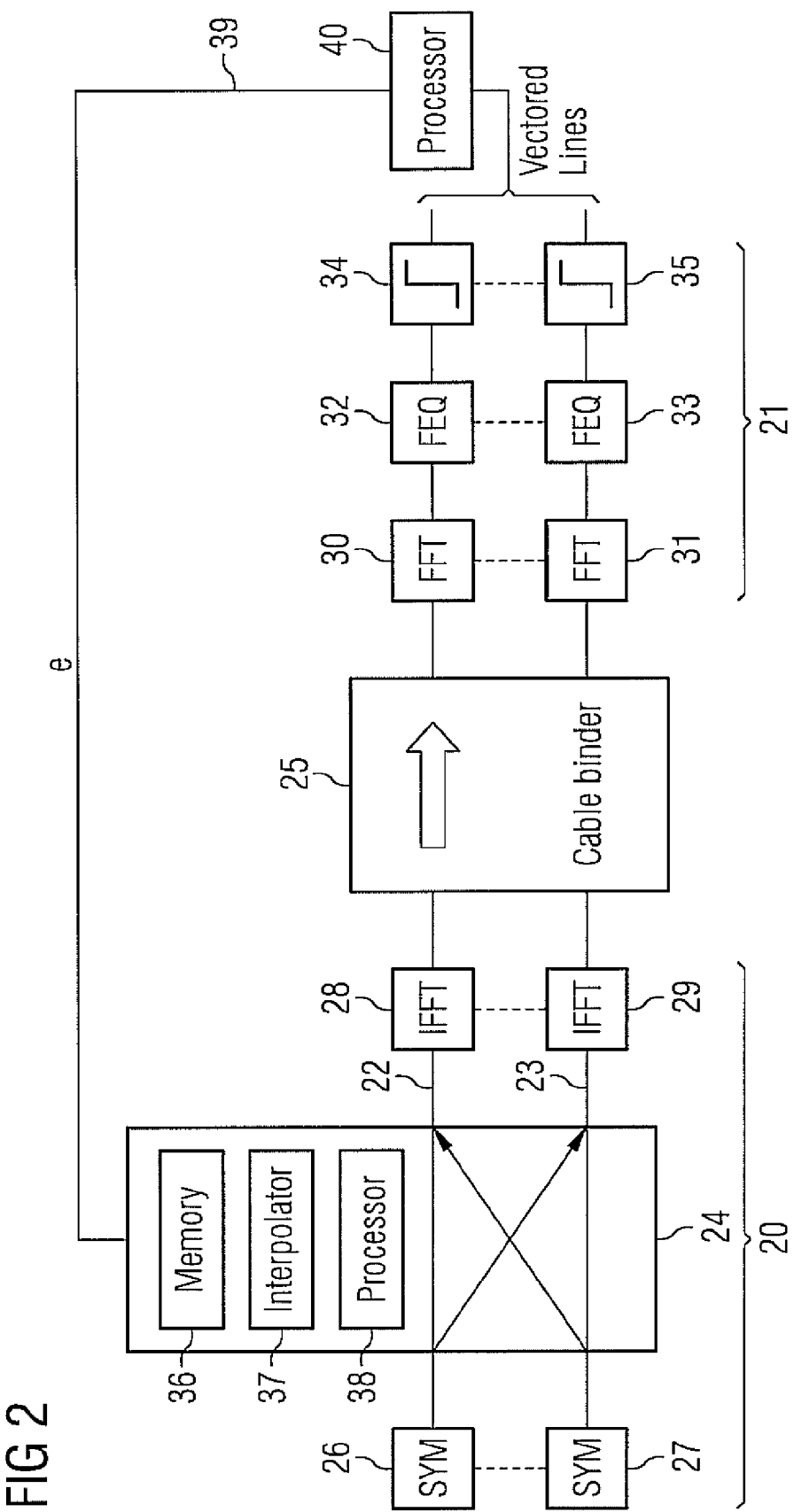
FIG. 2 shows a block diagram illustrating some features of a communication system according to an embodiment of the present invention.

In FIG. 2, a communication system according to an embodiment of the present invention is shown transmitting data in the downstream direction. It should be noted that the system of FIG. 2 shows only one of several possible implementations and is therefore not to be construed as limiting. In the system shown in FIG. 2, data is transmitted from a central office (CO) 20 via a plurality of communication lines of which two communication lines 22, 23 are shown to a plurality of receivers in customer premises equipment (CPE) generally denoted 21. In the system of FIG. 2, the communication lines are joined in a so-called cable binder 25. Communication lines in a cable binder are usually located comparatively close to each other and are therefore prone to crosstalk. In the system shown in FIG. 2, communication lines 22 and 23 as well as further (not shown) communication lines indicated by dotted lines are incorporated in a vectored group, i.e. for these communication lines crosstalk precompensation is performed at central office 20 as will be described in more detail below. It should be noted that the number of communication lines in the vectored group is not limited to any particular number.

In the system of FIG. 2, symbol mappers denoted with reference numerals 26, 27 map data, for example payload or training data, onto carrier constellations, i.e. a plurality of carriers each having its own frequency range, or, in other words, a plurality of channels, which are than to be transmitted via communication lines 22, 23, respectively. A crosstalk precompensator 24 which is an example for crosstalk reduction circuitry modifies these symbol mappings in order to precompensate crosstalk occurring during the transmission. This precompensation in an embodiment uses precompensation coefficients. For example, the symbols for the communication lines for each channel, i.e. each frequency, may be written as a vector which in crosstalk precompensator 24 is multiplied with a matrix containing the crosstalk precompensation coefficients.

The such modified carrier mappings are modulated onto a plurality of carriers for each communication line, said carriers as mentioned above having different frequencies, and are then transferred into signals in the time domain by inverse fast Fourier transformations 28 and 29, respectively. This type of modulation using a plurality of carriers is also referred to as discrete multitone modulation (DMT) and as commonly used in DSL systems like VDSL systems or VDSL2 systems. The such generated signals are then transmitted via the communication lines in the cable binder 25 to the customer premises 21. The received signals are then converted into the frequency domain by fast Fourier transformers 30 and 31, respectively and equalized by frequency equalizers 32, 33, respectively before slicers 34, 35, respectively output received constellations which, in case of an error-free transmission, correspond to input constellations generated in symbol mappers 26, 27 originally intended for transmission. It is to be understood that for clarity's sake only some elements of the communication devices involved and the corresponding transmit and receive circuitry are shown, and further elements like amplifiers, sampling units or analog to digital converters may be present.

In the system of FIG. 2, for some of the above-mentioned channels the precompensation coefficients are stored in a memory 36 of precompensator 24. For example, the precompensation coefficients of every $N_{int}$-th channel, for example of every fourth channel, every eighth channel, every thirty second channel, every fortieth channel etc. may be stored. An interpolator 37 of crosstalk precompensator 24 is used in the system of FIG. 2 to determine the precompensation coefficients of the remaining channels by interpolation. Examples for implementations of interpolator 37 will be described later.

The channels for which precompensation coefficients are stored in memory 36 will be referred to as first subset of channels in the following, while the channels for which the precompensation coefficients are obtained by interpolator 37 will be referred to as second subset of channels.

For determining the precompensation coefficients for the first subset of channels which are then stored in memory 36, in the embodiment shown in FIG. 2 predetermined training symbols according to a predetermined training sequence are sent from central office 22 to customer premises 21. Customer premises equipment 21, for example a processor 40 serving as calculation circuitry, then determines an error signal e which describes the difference between the received symbols and the sent symbols (which are known to customer premises 21 since predetermined, i.e. known, training sequences are used) and are sent back via a so-called back channel 39 to central office 20. It should be noted that in other embodiments, customer premises equipment 21 may calculate correlations between transmitted and received signals and transmit the correlation values instead of or in addition to the error signal e. In still other embodiments, instead of using known training sequences error signal e is determined based on unknown training or other data using for example the so-called slicer error. The back channel 39 may use one or more communication channels of the upstream direction which will be explained later with reference to FIG. 4. In other implementations, the error information may be incorporated in data packets sent in the upstream direction. A processor 38, for example a digital signal processor, of crosstalk precompensator 24 then calculates the precompensation coefficients for the first subset of channels.

It should be noted that interpolator 37 in some embodiments need not be a separate unit, but may be implemented by processor 38, for example by programming processor 38 accordingly.

Figure 3:
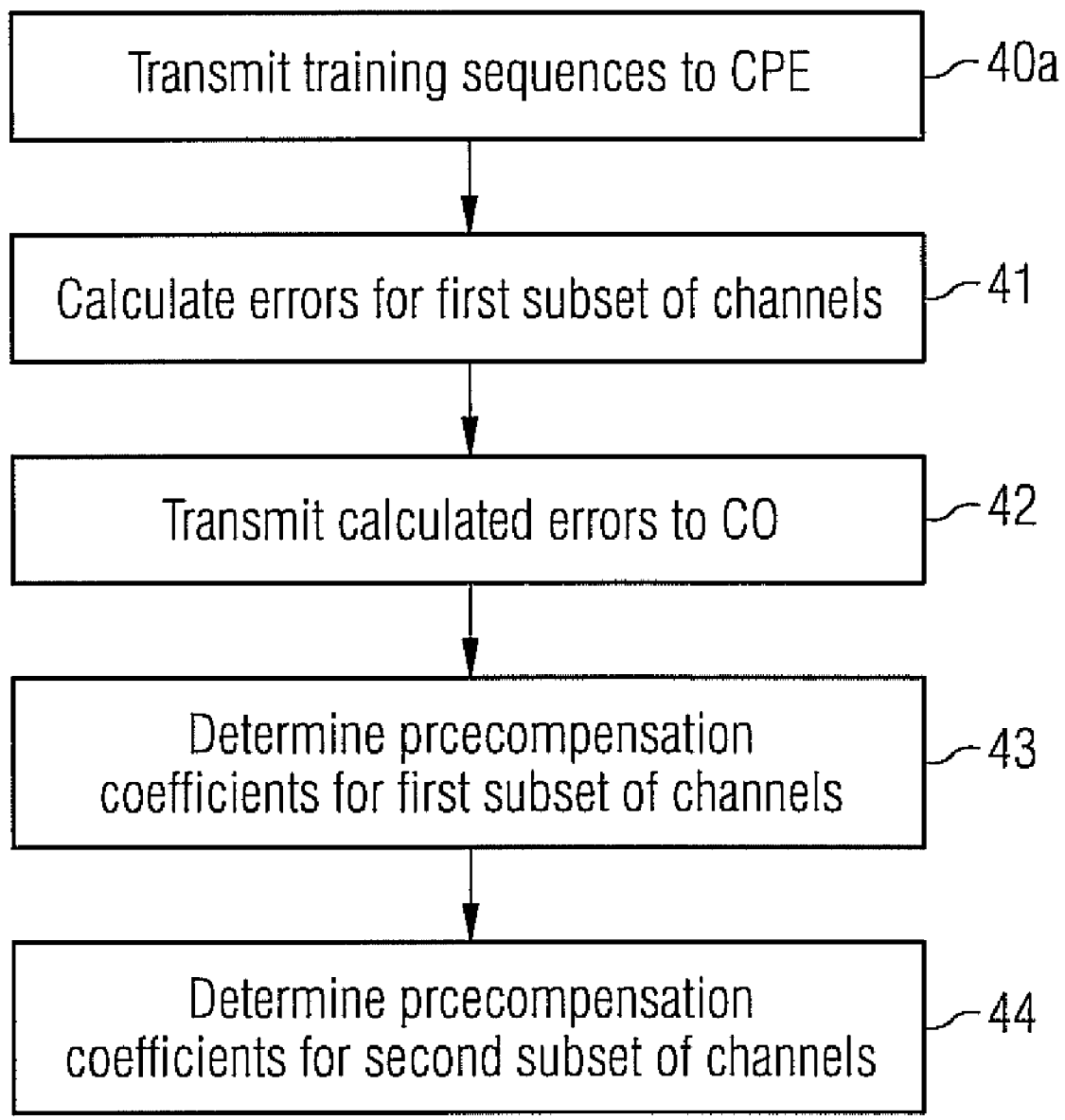
FIG. 3 shows a flow diagram illustrating a method according to an embodiment of the present invention.

Turning now to FIG. 3, a flow diagram is shown illustrating a method according to an embodiment of the present invention. The method illustrated in FIG. 3 for example may be implemented in the system of FIG. 2, but is not limited thereto and may also be implemented in other systems.

At 40a, training sequences, i.e. sequences of training data, are transmitted from a central office (CO) to customer premises equipment(CPE). Additionally, at 40a before, after and/or while transmitting the training sequences to the CPE, in an embodiment additionally information indicating which channels, for example which carriers in case of DSL transmission, are assigned to a first subset of channels may be transmitted to the CPE. This information may also be referred to as a frequency grid.

At 41, errors or other information indicative of the crosstalk are calculated at the customer's premises for a first subset of communication channels, these errors describing a deviation between the training sequence as received by the customer premises equipment and the training sequence as transmitted by the central office. In other words, the calculated errors are indicative of crosstalk experienced by the training sequences during transmission from central office to customer's premises.

At 42 these calculated errors are then transmitted from the customer's premises to the central office.

At 43, at the central office precompensation coefficients are determined for the first subset of communication channels based on the calculated errors.

At 44, precompensation coefficients for a second subset of communication channels are determined based on the precompensation coefficients for the first subset of channels, for example by interpolation. The first subset and second subset together may make up all vectored communication channels, i.e. each vectored communication channel in such a case belongs either to the first subset and the second subset.

Next, a communication system according to an embodiment of the present invention transmitting data in the upstream direction will be discussed with reference to FIGS. 4 and 5. It should be noted that the communication system shown in FIG. 4 may be the same communication system as shown in FIG. 2, in which case the Communication system allows for bidirectional communication, i.e. communication both in the upstream direction and in the downstream direction. In other embodiments, the communication systems of FIG. 2 and FIG. 4 may be seen as separate embodiments, one operating in the downstream direction and the other operating in the upstream direction. As the system of FIG. 2, the system of FIG. 4 shows only one possible implementation, and other implementations are equally possible.

Figure 4:
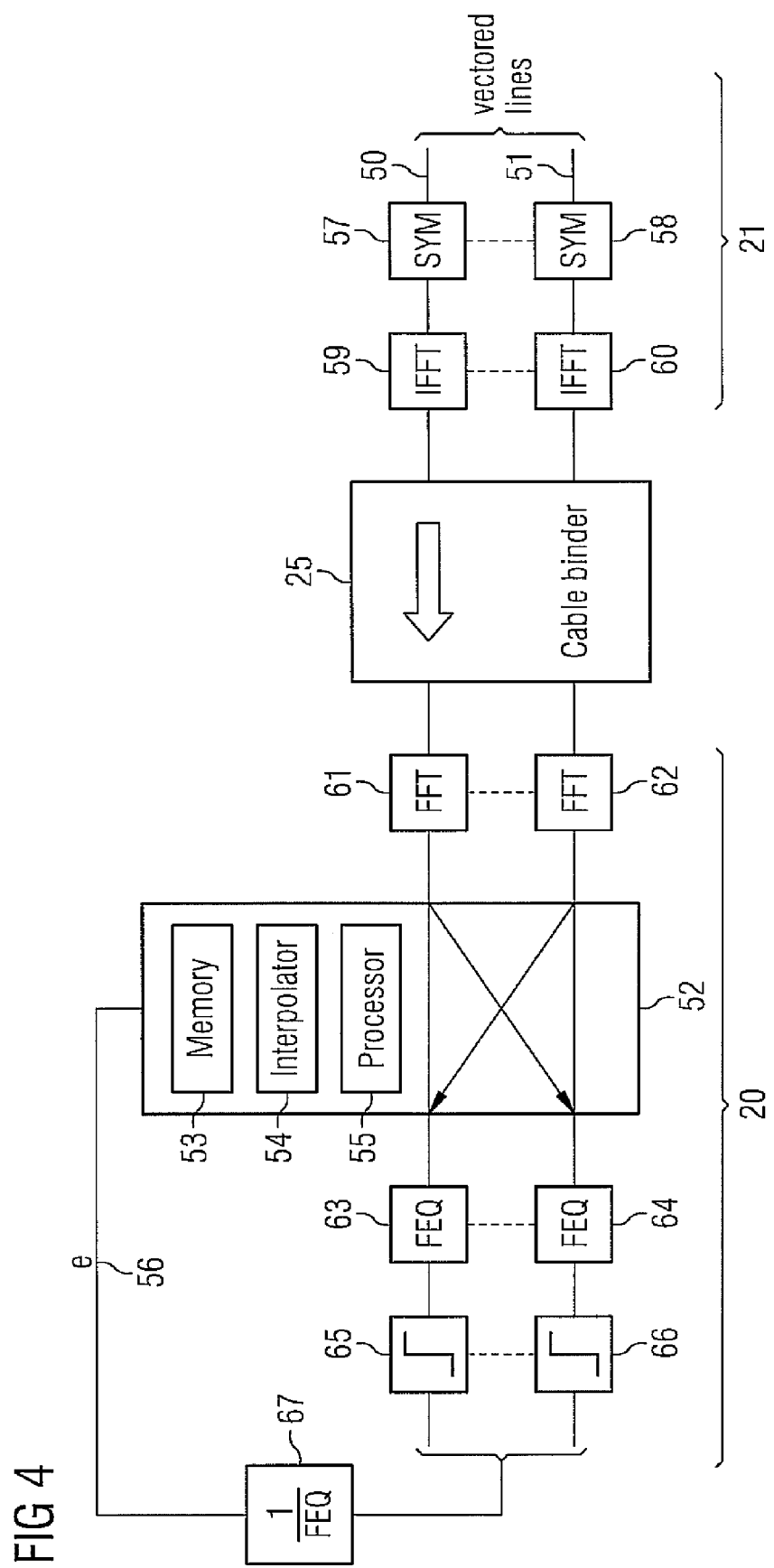
FIG. 4 shows a block diagram illustrating some features of a communication system according to an embodiment of the present invention.

In FIG. 4, on the side of customer premises equipment 21, symbol mappers 57 and 58 are provided to map symbols onto carrier constellations corresponding to a plurality of carriers or channels on each of communication lines 50, 51, which again are lines of a vectored group and representative of any arbitrary number of lines. It should be noted that in a bidirectional DSL system, lines 50, 51 of FIG. 4 may be identical to lines 22, 23 of FIG. 2, wherein different frequencies, i.e. different channels, are used for upstream direction and for downstream direction. The symbols are then transferred to the time domain by inverse fast Fourier transformers 59, 60, respectively, or, in other words, also in case of the embodiment of FIG. 4 discrete multitone modulation (DMT) is used. The signals are then transmitted in the upstream direction via a cable binder 25 and, in the central office, are transferred into the frequency domain by fast Fourier transformers 61, 62, respectively. A crosstalk canceller 52 is used to cancel crosstalk occurring between the lines in cable binder 25. It should be noted that crosstalk canceller 52 may fully or partially be implemented using the same circuit elements as crosstalk precompensator 24, for example by using a common digital signal processor, common interpolation circuitry and/or a common memory, but also maybe implemented using separate elements. Similar to what has already been described with reference to FIG. 2, in central office frequency equalizers 63, 64 followed by slicers 65, 66 are provided to recover received symbols which in case of error-free transmission correspond to the symbols originally sent.

The crosstalk cancellation performed in crosstalk canceller 52 may be performed in a similar manner as the crosstalk pre-compensation, i.e. the symbols output by Fast Fourier transformer 61, 62 may be seen as a vector which in an embodiment is multiplied with a matrix of crosstalk cancellation coefficients. In the embodiment of FIG. 4, first crosstalk cancellation coefficients for a first subset of channels used in the upstream direction may be stored in memory 53, and second crosstalk cancellation coefficients for the remaining channels which form a second subset may be determined by interpolation of the first crosstalk cancellation coefficients using interpolator 54. The operations for crosstalk cancellation may be performed by processor 55. Similar to what has been described with reference to FIG. 2, in the embodiment of FIG. 4 interpolator 54 may be incorporated in processor 55, for example in the form of routines or other specific programming of processor 55.

In order to obtain the first cancellation coefficient for the first subset of channels, in the embodiment of FIG. 4 customer premises equipment 21 transmit known test sequences of symbols to central office 20. An error signal e is then calculated and fed back to crosstalk canceller 52 via a feedback line 56 within central office 20. In the embodiment of FIG. 4, with an element 67 the frequency equalization performed in element 63, 64 is reversed, although this is not mandatory and may be omitted in other embodiments. It should be noted while a single feedback line 56 is depicted in FIG. 4, separate feedback lines for each communication line involved may be used. In the embodiment of FIG. 4, error signal e is calculated only for the first subset of channels, although in other embodiments error signal e may be calculated for the first subset of channels and for some additional channels or for all channels.

Figure 5:
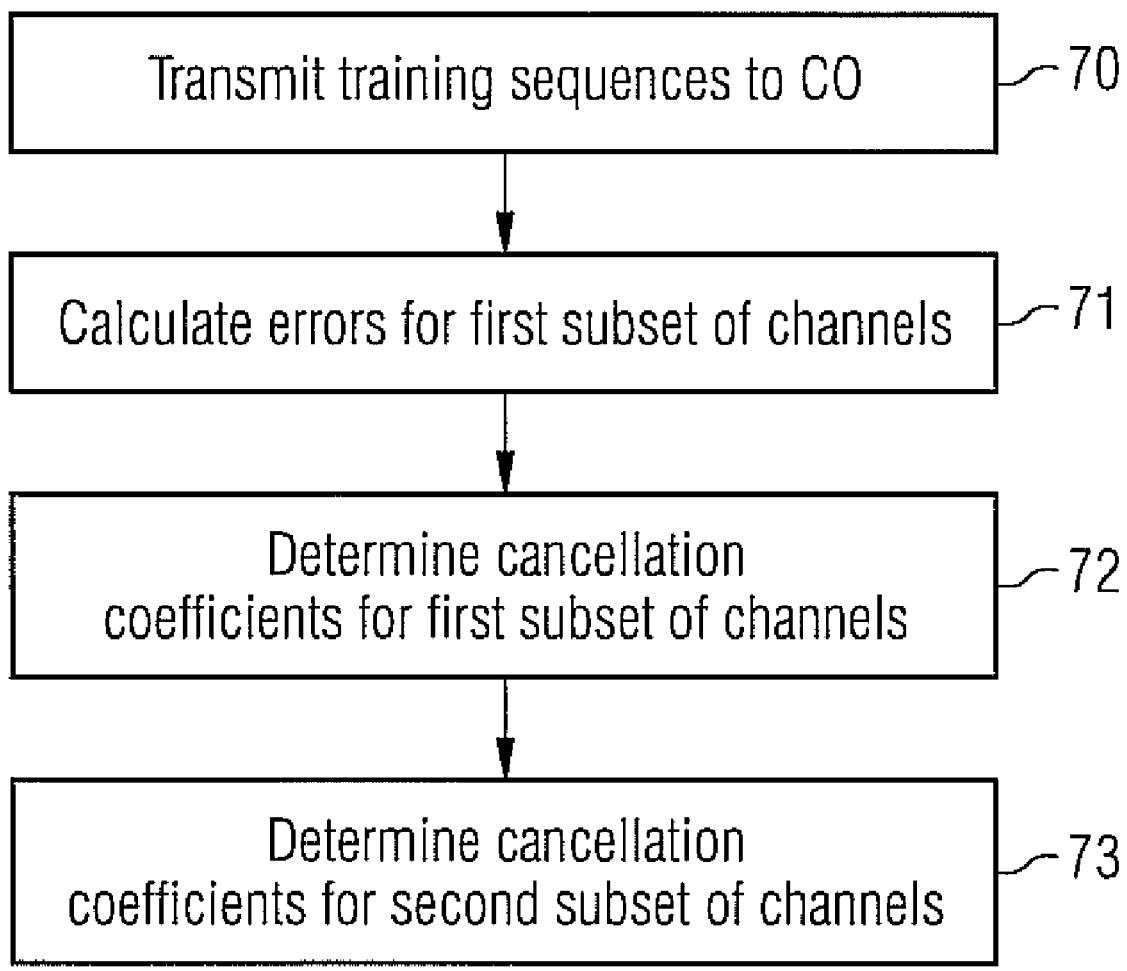
FIG. 5 shows a flow diagram illustrating a method according to an embodiment of the present invention.

Turning now to FIG. 5, a flow diagram illustrating a method according to an embodiment of the present invention is shown which may be implemented in the system of FIG. 4, but is not limited thereto and may be implemented also in other systems.

At 70, training sequences are transmitted from customer premises equipment to a central office via a plurality of communication channels, for example communication lines, wherein on at least some of the communication lines a plurality of communication channels each having a predetermined frequency is used.

At 71, based on the signals received at the central office, errors or other information indicative of crosstalk are calculated for a first subset of channels.

At 72, first cancellation coefficients usable for crosstalk cancellation are determined for the first subset of channels based on the calculated errors. The first subset of channels may for example comprise every $N_{int}$-th channel, for example every fourth channel, every eighth channel, every thirty second channel, although any number may be used.

At 73, second cancellation coefficients are determined for a second subset of channels based on the first cancellation coefficients for the first subset of channels, for example using interpolation. The second subset of channels may comprise all channels not comprised by the first subset of channels, i.e. in an embodiment each channel is either a channel of the first subset of channels or a channel of the second subset of channels.

It should be noted that the embodiments of methods described with reference to FIGS. 3 and 5 and also the systems of FIGS. 2 and 4 serve only as examples, and many modifications and variations are possible without departing from the scope of the present invention. For example, while it has been described that errors are calculated only for a first subset of channels, in other embodiments errors may be calculated for all channels, while precompensation or cancellation coefficients are still determined only for a first subset of channels. It is also possible in another embodiment that the training sequences are only transmitted for the channels of the first subset. The channels of the second subset in such a case could, but need not, receive different data (as for example payload data or control information or training signals for other purposes than crosstalk cancellation) at the same time. Furthermore, while for the above embodiments it has been described that only the precompensation or cancellation coefficients for the first subset of channels are stored in a memory like memory 36 of FIG. 2 or memory 53 of FIG. 4, in another embodiment after the coefficients for the first subset of channels and the second subset of channels have been calculated, all coefficients are stored in a memory.

Next, some embodiments for the interpolation mentioned above, for example the determination of the second coefficients for the second subset of channels based on the first coefficients of the first subset of channels or for the functioning of interpolators 37 and 54 will be discussed.

Figure 6:
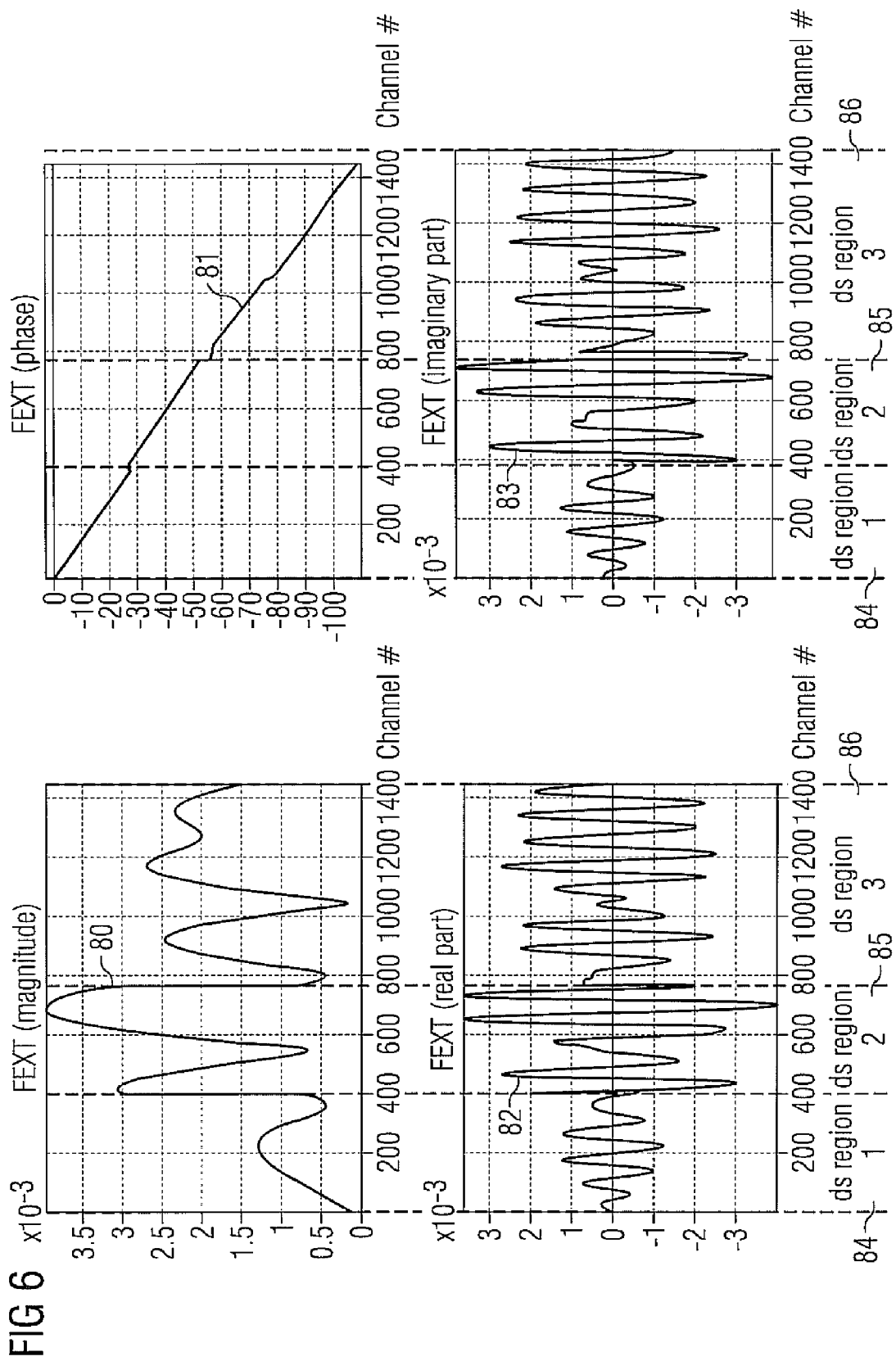
FIG. 6 shows graphs illustrating a crosstalk transfer function in a communication system according to an embodiment.

In FIG. 6, far-end crosstalk (FEXT) transfer functions are shown which represent the worst case for a simulation performed for one so-called victim line of 250 m length experiencing crosstalk from 23 further lines. The FEXT transfer function is a measure of the crosstalk transferred from one line of the other. In FIG. 6, this function is depicted for three distinct frequency regions 84, 85, 86 which correspond to frequency regions used for downstream channels in VDSL2 data transmission. These frequency regions in the example shown are discontinuous, and between the regions for example frequency regions for upstream data transmission may be situated. In FIG. 6, the functions are plotted over the channel number, wherein each channel in the example shown is 8.625 kHz wide.

Generally, the FEXT transfer function is a complex function. Complex numbers may be represented as magnitude (also referred to as amplitude) and phase, or as real part and imaginary part, wherein real part=magnitude·cosine (phase) and imaginary part=magnitude·sine (phase). In the upper two diagrams, a curve 80 shows the magnitude of the FEXT transfer function, and a curve 81 shows the phase of the FEXT transfer functions. In the lower two graphs, a curve 82 shows the real part of the FEXT transfer function, and a curve 83 shows the imaginary part of the FEXT transfer function.

As can be seen, in particular in the representation of real part and imaginary part, i.e. curves 82 and 83, oscillations occur.

Figure 7:
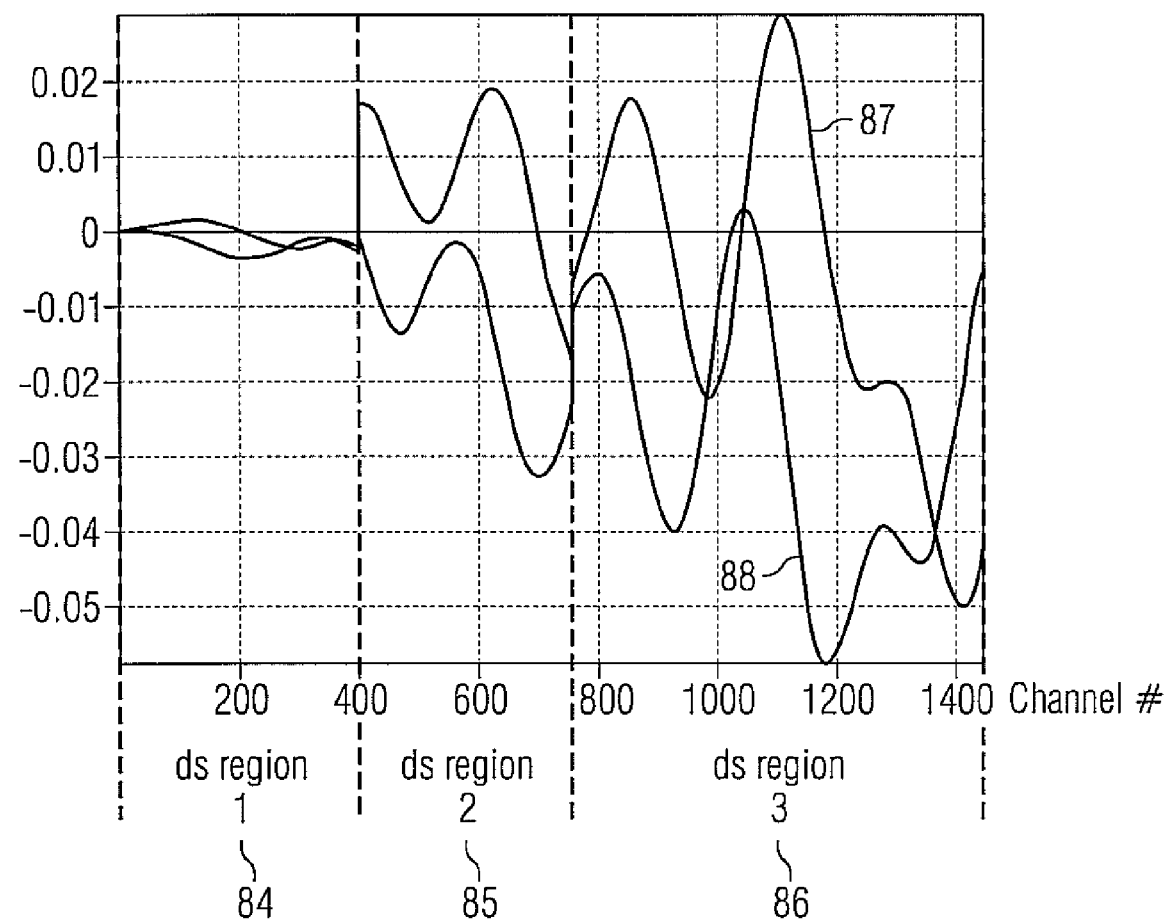
FIG. 7 shows a graph illustrating crosstalk precompensation coefficients in an embodiment of a communication system according to the present invention.

In FIG. 7, precompensation coefficients for reducing or eliminating the crosstalk according to the FEXT transfer function of FIG. 6 for the three frequency regions 84, 85, 86 are shown wherein curve 87 shows the real part and curve 88 shows the imaginary part of these coefficients. As can be seen in FIG. 7, while oscillations still occur these have a lower frequency than the oscillations in the real and imaginary part of the FEXT transfer functions.

The coefficients shown in FIG. 7 may be calculated based on the FEXT transfer function or may be calculated based on error signals as described with reference to FIGS. 2-5.

In embodiments of the present invention, a first subset of the coefficients, i.e. a part of the coefficients, is determined based on error signals or other measurements of the crosstalk, and the remaining coefficients which are comprised in a second subset of coefficients are calculated based on the first subset of coefficients, for example by using interpolation. In case of oscillating functions or curves like the one shown in FIG. 7 in some cases with increasing oscillation frequency more of the coefficients have to be in the first subset in order to maintain the same overall quality of interpolation or, in other words, more coefficients have to be provided as a basis for interpolation. In some embodiments, the first subset comprises every $N_{int}$-th coefficient, for example every fourth coefficient, every eighth coefficient, ..., wherein these numbers are only examples and basically every suitable number for $N_{int}$ may be used. $N_{int}$ will be also referred to as the interpolation rate in the following.

In an embodiment, interpolation is performed separately for the real part and imaginary part of crosstalk precompensation coefficients or crosstalk cancellation coefficients. In another embodiment, instead of real part and imaginary part, magnitude and phase which, as explained above, is an alternative way of representing complex numbers, may be used.

Figure 8:
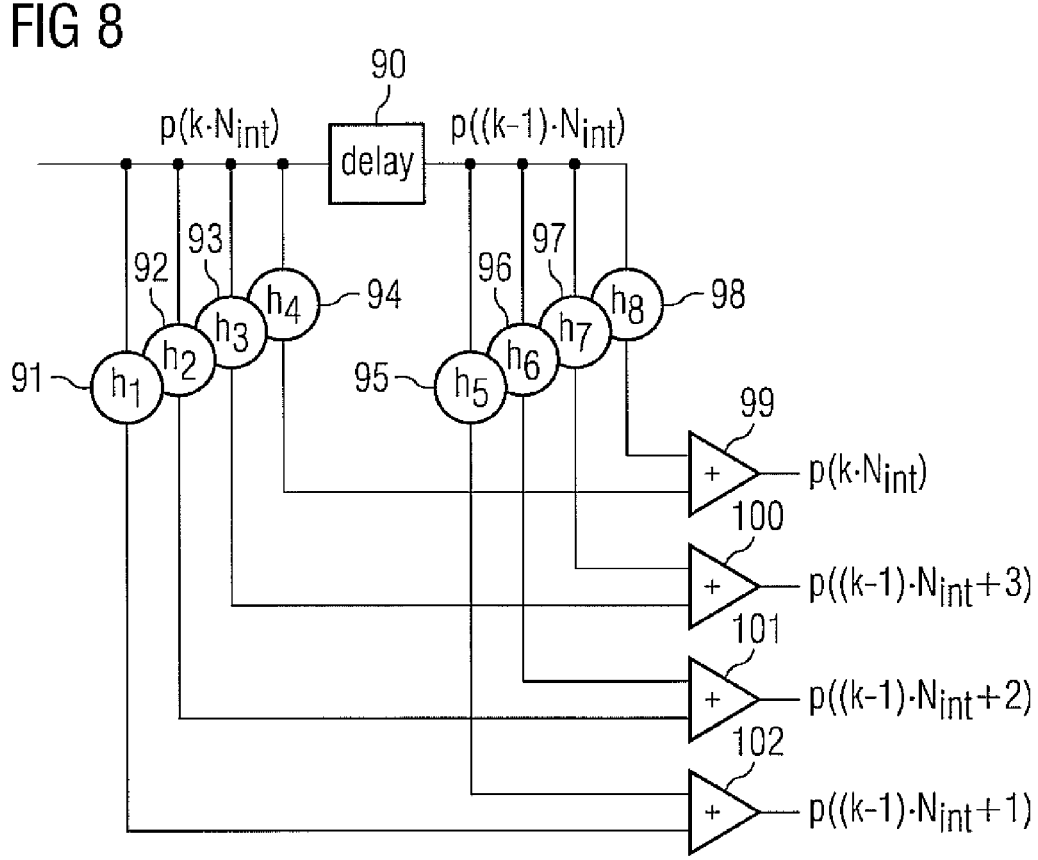
FIG. 8 shows an interpolation filter structure according to an embodiment of the present invention.

In FIG. 8, an embodiment of a filter structure for linear, i.e. first order, interpolation for an interpolation rate of $N_{int}=4$, is shown. Such a filter structure has a so-called length L=2 and may be used both for the real part and for the imaginary part. The filter structure may for example be implemented by programming a digital signal processor or a general purpose processor accordingly, but may also be implemented as dedicated hardware. In FIG. 8, p(l), l being an integer number, represents the l-th value p, wherein p may be the real or imaginary part of a particular coefficient of channel 1. In an embodiment, each channel 1 is associated with a matrix of coefficients. For simplicity of notation the subindices of the matrices are omitted in this notation. The values $p(k \cdot N_{int})$, k being an integer number, i.e. the coefficients at a corresponding position (i,j) of the matrix of every $N_{int}$-th channel, are calculated for example based on error signals. These coefficients are in the embodiment of FIG. 8 fed to a delay unit 90 which causes a delay, such that when before delay unit 90 coefficient $p(k \cdot N_{int})$ is present, after delay unit 90 the previous value $p((k-1) \cdot N_{int})$ is present.

The values of p between $l=k \cdot N_{int}$ and $l=(k-1) \cdot N_{int}$, i.e. for the case $N_{int}=4$ the values $p((k-1) \cdot N_{int}+1)$, $p((k-1) \cdot N_{int}+2)$ and $p((k-1) \cdot N_{int}+3)$ are calculated, and in the structure of FIG. 8 additionally $p(k \cdot N_{int})$ is output. The filter structure shown in FIG. 8 comprises four outputs which are outputs of adders 99, 100, 101, 102. To each of adders 99-102, the value before delay unit 90, in the example shown $p(k \cdot N_{int})$, is fed via one of multipliers 91-94 where the value is multiplied with filter coefficients $h_1$-$h_4$, respectively, is fed, and via multipliers 95-98 the value of the delay unit 90, in this case $p((k-1) \cdot N_{int})$ multiplied by filter coefficients $h_5$-$h_8$ in multipliers 95-98, respectively, is fed as shown in FIG. 8.

In the embodiment of FIG. 8, as shown adder 99 outputs $p(k \cdot N_{int})$, adder 100 outputs $p((k-1) \cdot N_{int}+3)$, adder 101 outputs $p((k-1) \cdot N_{int}+2)$ and adder 102 outputs $p((k-1) \cdot N_{int}+1)$. These values in the filter structure of FIG. 8 are calculated as follows:

$$p(k \cdot N_{int}) = h_4 \cdot p(k \cdot N_{int}) + h_8 \cdot p((k-1)N_{int})$$

$$p((k-1) \cdot N_{int}+3) = h_3 \cdot p(k \cdot N_{int}) + h_7 \cdot p((k-1)N_{int})$$

$$p((k-1) \cdot N_{int}+2) = h_2 \cdot p(k \cdot N_{int}) + h_6 \cdot p((k-1)N_{int})$$

$$p((k-1) \cdot N_{int}+1) = h_1 \cdot p(k \cdot N_{int}) + h_5 \cdot p((k-1)N_{int})$$

Figure 9:
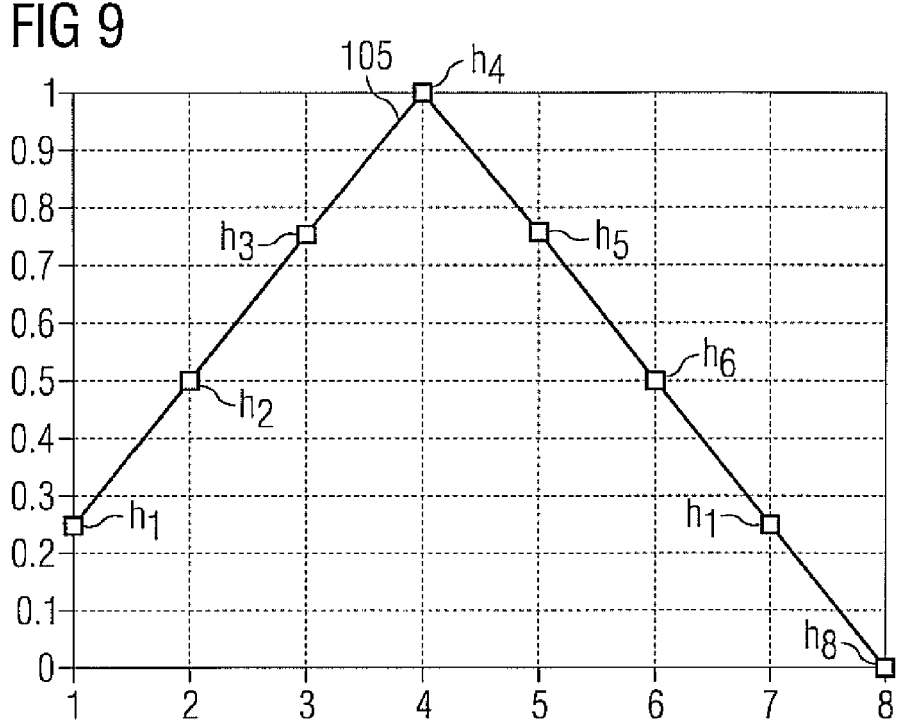
FIG. 9 shows an example for an impulse response of the interpolation filter structure of FIG. 8.

From the above it follows that $h_4=1$ and $h_8=0$. Moreover, for linear interpolation $h_2=h_6=0.5$; $h_3=h_5=0.75$ and $h_1=h_7=0.25$ are valid. This leads to an impulse response of the filter shown in FIG. 8 as shown with curve 105 in FIG. 9, wherein the integer values on the horizontal axis corresponds to the indices of the filter coefficient $h_1$ to $h_8$ and the values on the vertical axis corresponds to the values of the coefficients. It should be noted that these values serve only as an example, and other values may also be used if the interpolation is not to be linear. Moreover, the value $N_{int}=4$ is just an example, and a corresponding filter structure could also be used for interpolation for a different value of $N_{int}$ by increasing or decreasing the number of multipliers 91-98 and adders 99-102.

It is to be noted that the interpolation filter structure of FIG. 8 is only one possible implementation of an interpolation filter, and other implementations are equally possible. For example, FIG. 10 shows an interpolation filter according to another embodiment of the present invention which basically has the same impulse response as the filter explained above with reference to FIGS. 8 and 9.

Figure 10:
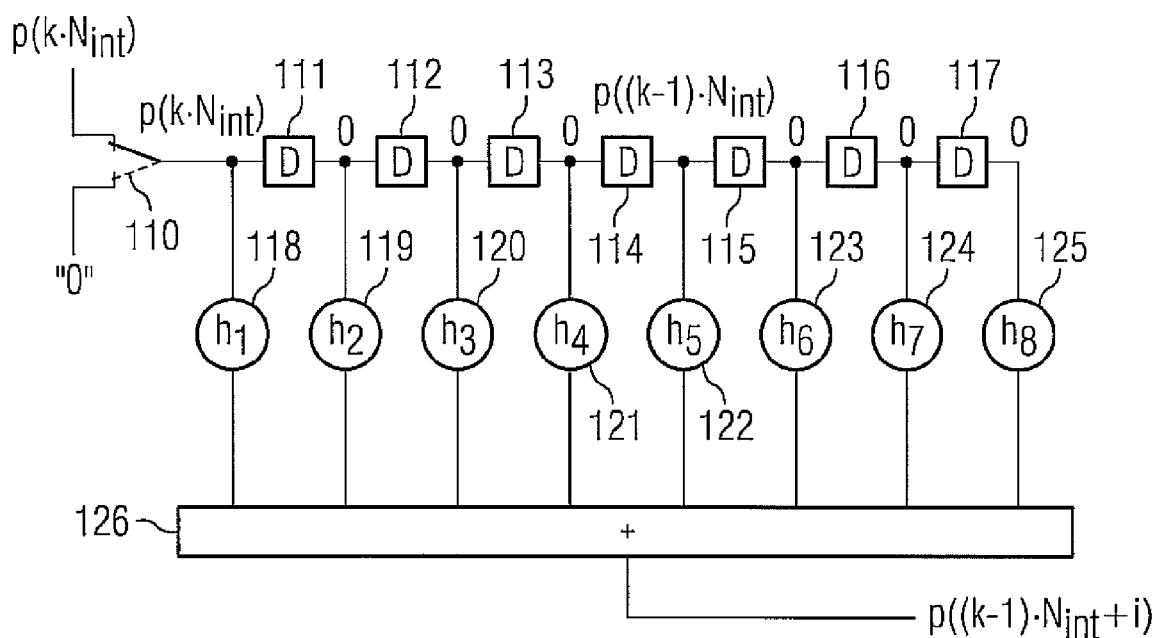
FIG. 10 shows an interpolation filter structure according to another embodiment of the present invention.

The filter shown in FIG. 10 is in the so called "normal form" i.e. it has a chain of delay elements 111-117 between which signals are tapped and multiplied by filter coefficient $h_1$-$h_8$ in multipliers 118-125, respectively, wherein the outputs of multipliers 118-125 are added in adder 126. The filter structure of FIG. 10 outputs the values p including both the originally calculated values $p(k \cdot N_{int})$ and the interpolated values in between. As explained above, p may for example be the real part or the imaginary part of a precompensation coefficient or a cancellation coefficient. The values $p(k \cdot N_{int})$ are fed to the filter. Since in the present case where $N_{int}=4$ the number of values output is four times the number of values input, in order to have the same input rate to the structure as output rate zeros are inserted between the values $p(k \cdot N_{int})$ via a switch 110. This is also referred to as upsampling. In case of $N_{int}=4$, three zeros are inserted after each value $p(k \cdot N_{int})$.

Above the nodes between, before and after delay elements 111-117, exemplary signal values are shown as an example for a case where the value $p(k \cdot N_{int})$ has been last fed to the chain of delay elements. In this case, the output of the filter corresponds to $h_1 \cdot p(k \cdot N_{int}) + h_5 \cdot p((k-1)N_{int})$ or, in other words, $p((k-1)N_{int}+1)$ is calculated. In a next time step, the values shown would move one node to the right in FIG. 10, and a new zero would be fed to the chain of delay elements via switch 110. In this case, $p((k-1) \cdot N_{int}+2)$ would be output etc.

In the above example, a first order interpolation (L=2) is used. A first order interpolation means that two values (for example $p(k \cdot N_{int})$ and $p((k-1) \cdot N_{int})$) are used to interpolate the values in between, for example using linear interpolation as in the examples above. In other embodiments, other interpolation orders may be used. For example, a zero order interpolation (L=1) may be used where for example the values $p((k-1) \cdot N_{int}+i)$, i=1, 2, 3 are simply set to $p((k-1) \cdot N_{int})$ or simply set to $p(k \cdot N_{int})$. In still other embodiments, higher order interpolations, for example second order interpolation (L=3) or third order interpolation (L=4), may be used. In second order interpolation three values, for example three compensation or cancellation coefficient values, which are determined for example based on an error signal as explained above are used as a basis for each interpolative value. For example, $p(k \cdot N_{int})$, $p((k-1) \cdot N_{int})$ and $p((k-2) \cdot N_{int})$ could be used for determining values of p between $p((k-2) \cdot N_{int})$ and $p(k \cdot N_{int})$.

Figure 11:
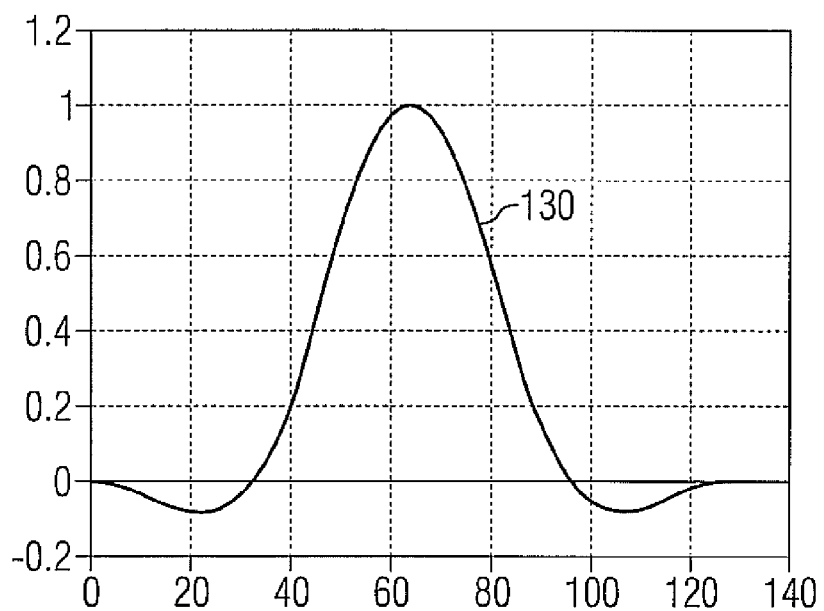
FIG. 11 shows an impulse response of an interpolation filter according to an embodiment of the present invention.

Also, while in the above example $N_{int}$ has been set to four, in other embodiments other values for $N_{int}$ may be used. As an example, a curve 130 in FIG. 11 shows a possible impulse response of a third order interpolation filter (L=4) (for example four values calculated based on error signals are used as a basis for determining each interpolated value) and an interpolation rate $N_{int}=32$ are shown. In such a case, a corresponding filter in an embodiment has $L \cdot N_{int}$, in this case $4 \cdot 32=128$ filter coefficients, which correspond to the values of curve 130 at the integer values on the horizontal axis.

For realizing a corresponding interpolation filter, any suitable structure, for example a normal structure, may be used, or a digital signal processor may be programmed accordingly to yield the desired impulse response.

In embodiments of the present invention as already mentioned, data is transmitted in certain frequency ranges. For example, as already explained with reference to FIGS. 6 and 7, data may be transmitted in the downstream direction in three distinct frequency regions. In some embodiments, for example for higher order interpolation like second order interpolation (L=3) or third order interpolation (L=4), at the borders of the frequency regions additional measures are taken for interpolation. For example, in an embodiment as explained above for a frequency range a grid defining a first subset of channels is given for which coefficient values are calculated based on error signals, and in an embodiment additional "virtual" grid values are calculated by extrapolating the grid values to points outside the frequency range. Such an embodiment will be explained with reference to FIG. 12.

Figure 12:
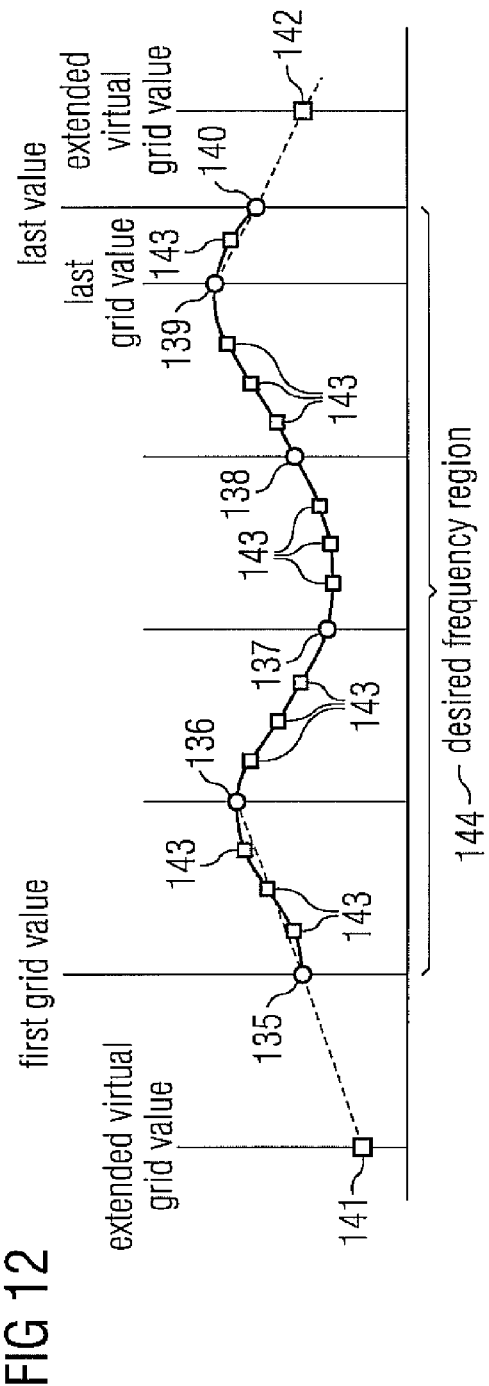
FIG. 12 shows a graph for illustrating some features of an embodiment of the present invention.

In FIG. 12, a desired frequency region is labeled 144. Frequency region 144 may for example correspond to one of regions 84, 85 and 86 of FIGS. 6 and 7. For this frequency region 144, grid values, i.e. coefficient values for channels of the above-defined first subset of channels, are calculated for example based on error values. These values are labeled 135, 136, 137, 138 and 139 in FIG. 12. Additionally, at the end of the frequency region a last value 140 is provided which may also be seen as part of the grid. In FIG. 12, between the values 135-140 additional interpolated values 143 are determined for example by interpolation filtering as explained above. In the example shown in FIG. 12, $N_{int}=4$, i.e. three interpolated values are calculated between each two successive grid values. The reason that in the nomenclature of FIG. 12 the last value 140 is not seen as a grid value is that in this case the total number of values is not such that with the regular spacing shown in FIG. 12 (one grid value every four values or channels) the last grid value coincides with the last channel of the desired frequency region. Therefore, in the embodiment of FIG. 12 the last channel of the desired frequency region is additionally attributed to the first subset of channels, and the number of interpolated values 143 between the last grid value 139 and the last value 140 differs from the number of interpolated value between two grid values (one interpolated value in contrast to three interpolated values in the example of FIG. 12). However, in other embodiments this additional last value may be omitted, and in still other embodiments the number of overall channels may be such that the last grid value coincides with the last channel of the desired frequency region.

In the embodiment currently explained with reference to FIG. 12, a higher order interpolation, for example a second order interpolation (L=3) where each interpolated value 143 is calculated based on three grid values, is used. In the embodiment of FIG. 12, as a basis for calculation of interpolation values at the border regions of frequency region 144, for example interpolation values 143 between grid values 135 and 136 or interpolation values 143 between grid values 138 and 139 or between last grid value 139 and last value 140, additional extended "virtual" grid values 141 and 142 which may be seen as belonging to a third subset of channels are used. These extended virtual grid values are determined based on grid values at the border of desired frequency region 144. For example, in an embodiment extended virtual grid value 141 is determined by linear extrapolation of grid values 135 and 136, and extended virtual grid value 142 is determined based on a linear extrapolation of last grid value 139 and last value 140. In other embodiments, for example extended virtual grid value 141 could be set to first grid value 135 or be calculated based on grid values 135, 136 and 137. Corresponding considerations hold true for extended virtual grid value 142, which in another embodiment may be set to last value 140 or be calculated based on more values than values 139 and 140, for example based on values 138, 139 and 140. These extended virtual grid values are then also used as a basis for interpolation, i.e. for determining values 143.

In another embodiment, different interpolation filters may be used for different parts of a desired frequency region. Such an embodiment will now be explained with reference to FIG. 13.

Figure 13:
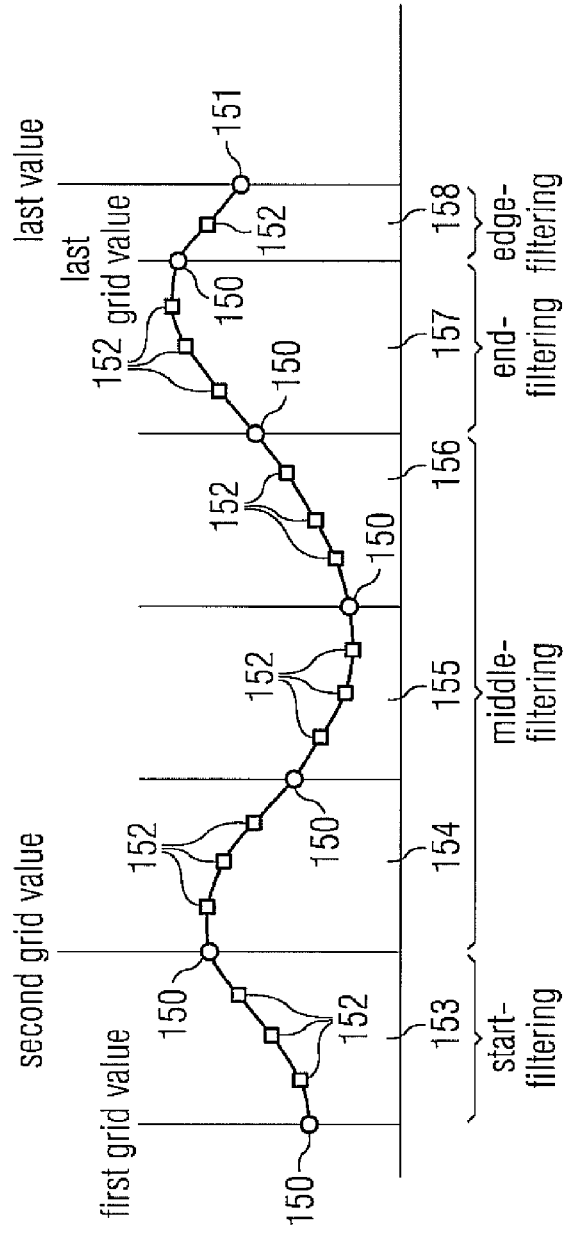
FIG. 13 shows a graph for illustrating some features of an embodiment of the present invention.

In FIG. 13, a frequency region is shown in which grid values 150 and a last value 151 the function of which basically corresponds to the function of grid values 135 to 139 and last value 140 of FIG. 12 are provided for a first subset of channels. Between grid values 150 and between a last grid value 150 and last value 151, interpolated values 152 for a second subset of channels are determined using interpolation filters.

In the embodiment of FIG. 13, for determining interpolation values in a region 153 between a first grid value 150 and a second grid value 150, a first filter, which may be referred to as start filter, is used. For regions 154, 155 and 156 a second filter which may be referred to as middle filter is used. For a region 157 which corresponds to the region delimited by the last grid value 150 and the grid value preceding the last grid value, in the embodiment of FIG. 13 a third filter which may be referred to as end filter is used. Finally, for the region 158 between the last grid value 150 and the last value 151 a fourth filter which may be referred to as edge filter is used. In the embodiment shown in FIG. 13, the first filter, the second filter and the third filter each have an interpolation rate $N_{int}=4$, although other interpolation values may be used as well, and the interpolation values of first filter, second filter and third filter need not be the same. For fourth filter which is used for region 158, an interpolation rate $N_{int}=1$ is used. As already explained with reference to FIG. 12, in other embodiments no last value 151 is provided, and correspondingly the fourth filter may be omitted.

It should be noted that the embodiments of FIGS. 12 and 13 may be combined with each other, but also may be used separately.

The impulse responses for first filter, second filter, third filter and fourth filter in the embodiment of FIG. 13 vary and may be adapted to the situation at the specific region. Furthermore, it should be noted while a start filter, a middle filter and an end filter is provided in the embodiment of FIG. 13, in other embodiments the region between the first grid value and the last value may be divided in two subregions instead of three subregions as in FIG. 13, and a first filter, which may be referred to as start/middle filter, and a second filter, which may be referred to as middle/end filter, may be provided to perform the interpolation in the first subregion and the second subregion in this case.

Furthermore, it should be noted that for first filter, second filter, third filter and fourth filter (or any other number of filters used in a specific embodiment) the same filter structure may be used for which the filter coefficients are changed for each filtering, or separate filter structures may be used.

The filter coefficients for such filters, or in other words the impulse response of the filters, may for example be determined at a first start of a corresponding communication system. In this case, at the first use of the system for example all coefficients (preceding coefficients or cancellation coefficients) may be determined based on error signals for all channels used, and the coefficients of the interpolation filters are then determined so that the squared interpolation error for all coefficients to be interpolated in later uses of the system is minimized. Such a scheme may also be used to determine impulse responses for cases where a single interpolation filter is used. In other embodiments, impulse responses for filters used may be determined based on simulations for typical systems.

Next, some examples for such impulse responses will be explained with reference to FIGS. 14 and 15.

Figure 14A:
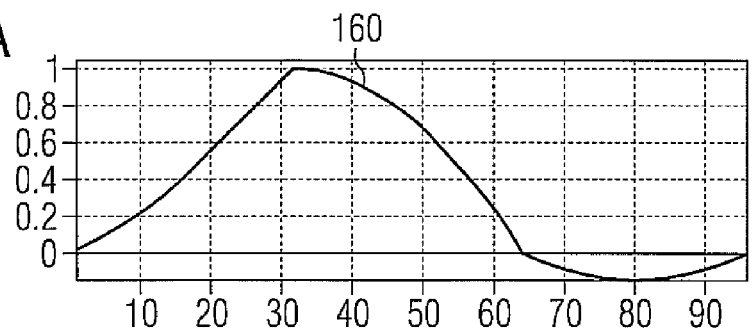
FIGS. 14A and 14B are graphs illustrating impulse responses of interpolation filters according to an embodiment of the present invention.
Figure 14B:
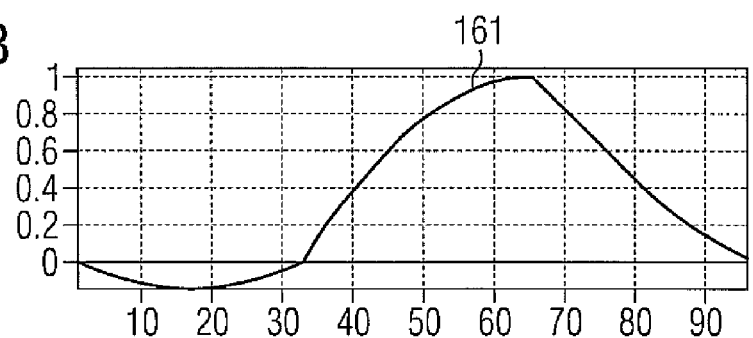

In FIG. 14, impulse responses of interpolation filters for a length L=3 (i.e. second order interpolation) and an interpolation rate of $N_{int}=32$ is shown. In this case, the desired frequency region is partitioned in two subregions, and FIG. 14A shows an impulse response 160 for a first filter used for a start and middle region (for example corresponding to regions 153, 154 and 155 of FIG. 13), and a curve 161 in FIG. 14B shows an impulse response of a filter used for middle and end region, for example regions 156 and 157 in the example of FIG. 13.

Figure 15A:
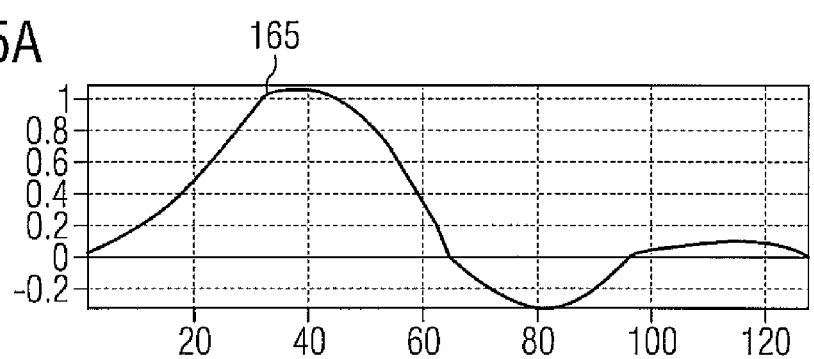
FIGS. 15A to 15C illustrate impulse responses of interpolation filters according to another embodiment of the present invention.
Figure 15B:
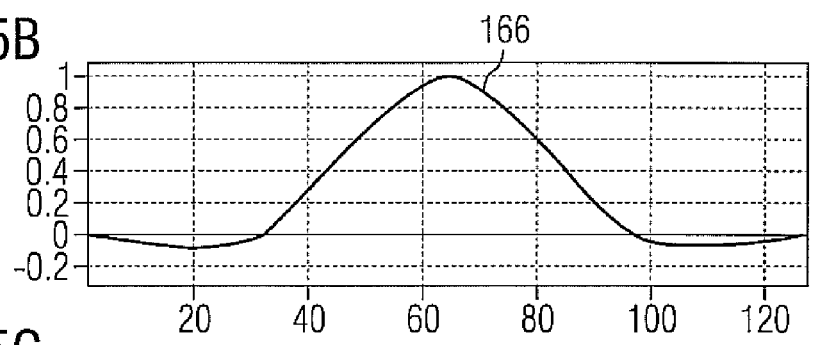
Figure 15C:
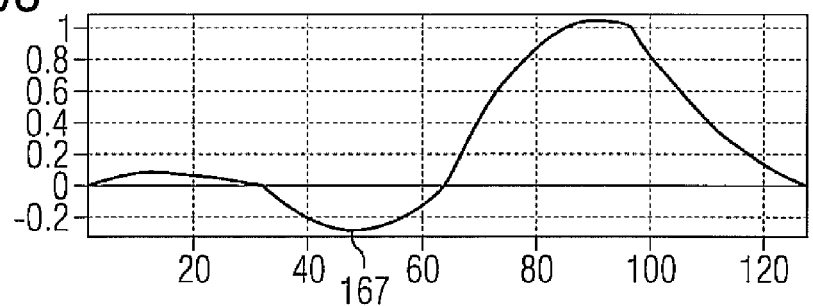

In FIG. 15, impulse responses are shown as an example for a third order interpolation (L=4) and an interpolation rate of an $N_{int}=32$. In this example, the desired frequency region is partitioned in three subregions, and a curve 165 in FIG. 15A shows an impulse response for a first filter corresponding to a start filter, a curve 166 in FIG. 15B shows the impulse response of a second filter for a middle region, i.e. a middle filter, and a curve 167 in FIG. 15C shows an impulse response for a third filter used in an end region, i.e. an end filter as described above.

It should be noted that these impulse responses of FIGS. 14 and 15 serve only as examples, and other impulse responses may be used adapted to the specific situations. It is to be noted that for other interpolation rates, similar impulse responses may be used which are scaled to accommodate more coefficients. For example, in FIG. 14, for L=3 and $N_{int}=32$ 96 coefficients are provided, while for a filter with L=3 and $N_{int}=40$ 120 coefficients would be provided, and in an embodiment the impulse responses of FIG. 14 could be scaled accordingly. Similar considerations hold true for the example of FIG. 15, where for example for L=4 and $N_{int}=48$ 192 coefficients would be provided and the impulse responses would be scaled accordingly.

The impulse responses of FIGS. 14 and 15 have been provided taking a VDSL2 system for downstream preceding and a symbol rate of 8 kHz as an example. Similar filters may be used in case of an upstream crosstalk cancellation. In other systems, other symbol rates or bandwidth may be used.

In the embodiments described above, it has been assumed that a fixed grid of channels of a first subset, i.e. channels which are to be used as a basis for interpolation, is provided. In other embodiments, the grid may be chosen depending on system parameters. For example, the interpolation rate $N_{int}$ and therefore the density of the channels of the first subset may be chosen depending on line length, signal to noise ratio (SNR) or throughput requirements, wherein for example for lower signal to noise ratios or higher throughput requirements a lower interpolation rate is chosen. The interpolation rate or the frequency grid of the channels of the first subset may also be adapted during data transmission, for example as the signal to noise ratio of the communication connections, for example communication lines, involved changes. For example, in an embodiment, when the signal to noise ratio falls below a predetermined threshold, the interpolation rate $N_{int}$ is decreased.

Furthermore, it has to be noted that while in the examples above, crosstalk reduction is performed at a central office, such crosstalk reduction in other embodiments may be performed at any location where a joint processing of signals sent via two or more lines may be performed, for example at locations where transmitters and/or receivers are co-located.

Furthermore, as already explained above, real and imaginary parts of coefficients like pre-compensation coefficients or crosstalk cancellation coefficients may be interpolated separately. For these separate interpolations, different interpolation filters using different filter coefficients, different interpolation rates and/or different filter lengths, i.e. interpolation orders, may be used. As mentioned above, instead of interpolating real and imaginary parts, phase and magnitude or any other possible storage format of the coefficients may be interpolated. In other systems, instead of interpolating the coefficients, any other crosstalk parameters describing the crosstalk between communication connections involved may be interpolated.

While embodiments of methods have been described as comprising a number of operations or acts, the order such operations are executed in may vary, and in other embodiments only some of the described operations or acts may be performed, and/or additional operations or acts may be included. For example, in embodiments only those operations performed in a central office or only those operations performed in customer premises equipment may be included.

As can be seen, a plurality of variations and alternatives are possible without departing from the scope of the present invention, which is not intended to be limited by the embodiments and examples described above, but which is intended to be limited only by the appended claims and equivalents thereof.

What is claimed is:

1. A communication device, comprising:
   a memory configured to store first crosstalk reduction parameters for a first subset of communication channels of a plurality of communication connections;
   an interpolation circuit to determine second crosstalk reduction parameters for a second subset of communication channels of said plurality of communication connections based on said first crosstalk reduction parameters; and
   a crosstalk reduction circuit configured to reduce crosstalk between said plurality of communication connections based on said first crosstalk reduction parameters and said second crosstalk reduction parameters.

2. The communication device of claim 1,
   wherein said first subset of communication channels and said second subset of communication channels form a plurality of communication channels for communicating via said plurality of communication connections, and
   wherein the communication channels of said first subset are distributed substantially evenly in said plurality of communication channels.

3. The communication device of claim 1,
   wherein said interpolation circuit comprises an interpolation filter,
   wherein said communication channels of said first subset and said second subset are located in a predetermined frequency range, and
   wherein said interpolation filter comprises separate interpolation filters for at least two different portions of said frequency range.

4. The communication device of claim 1,
   wherein said interpolation circuit comprises an interpolation filter, and
   wherein said interpolation filter is chosen from the group comprising a linear filter and a higher order filter.

5. The communication device of claim 1, wherein said interpolation circuit is configured to assign each second crosstalk reduction parameter a value of an adjacent crosstalk reduction parameter.

6. The communication device of claim 1, wherein said second communication parameters are complex parameters, and wherein said interpolation circuit is configured to determine a real part and an imaginary part of said second communication parameters separately.

7. The communication device of claim 1, wherein said second communication parameters are complex parameters, and wherein said interpolation circuit is configured to determine a magnitude and a phase of said second communication parameters separately.

8. The communication device of claim 1, wherein said communication channels of said first subset and said second subset are arranged in a frequency range, and wherein said interpolation circuit is further configured to determine third crosstalk reduction parameters for a third subset of communication channels outside said frequency range based on said first crosstalk reduction parameters, and to determine said second crosstalk reduction parameters based on said first crosstalk reduction parameters and said third crosstalk reduction parameters.

9. The communication device of claim 1, further comprising receive circuitry configured to receive training signals via a plurality of communication channels comprising said communication channels of said first subset and said second subset of said plurality of communication connections, wherein said communication device is further configured to determine said first crosstalk reduction parameters based on said training signals.

* * * * *